United States Patent

Minobe et al.

[11] Patent Number: 5,950,183
[45] Date of Patent: Sep. 7, 1999

[54] CAUSE INFERRING DEVICE

[75] Inventors: Kaori Minobe, Yokohama; Hiroyoshi Yamaguchi, Hiratsuka, both of Japan

[73] Assignee: Komatsu Ltd., Kanagawa, Japan

[21] Appl. No.: 08/793,422

[22] PCT Filed: Jun. 2, 1995

[86] PCT No.: PCT/JP95/01086

§ 371 Date: Feb. 4, 1997

§ 102(e) Date: Feb. 4, 1997

[87] PCT Pub. No.: WO96/05555

PCT Pub. Date: Feb. 22, 1996

[30] Foreign Application Priority Data

Aug. 9, 1994 [JP] Japan .................................... 6-187412

[51] Int. Cl.$^6$ .................................................. G06F 9/44
[52] U.S. Cl. .................. 706/52; 395/183.01; 395/183.02
[58] Field of Search ........................ 395/183.01, 183.02; 706/52, 911, 916

[56] References Cited

U.S. PATENT DOCUMENTS

| | | | |
|---|---|---|---|
| 5,214,653 | 5/1993 | Elliott, Jr. et al. ................. | 395/183.02 |
| 5,253,333 | 10/1993 | Abe ........................................... | 706/53 |
| 5,293,323 | 3/1994 | Doskocil et al. ................... | 395/183.01 |
| 5,301,258 | 4/1994 | Haysahi ..................................... | 706/52 |
| 5,528,516 | 6/1996 | Yemini et al. .......................... | 702/181 |
| 5,729,452 | 3/1998 | Smith et al. ............................... | 701/29 |

FOREIGN PATENT DOCUMENTS

| | | | |
|---|---|---|---|
| 01251139 | 10/1989 | Japan ................................. | G06F 9/44 |
| 02211538 | 8/1990 | Japan ................................. | G06F 9/44 |
| 03116330 | 5/1991 | Japan ................................. | G06F 9/44 |
| 04338828 | 11/1992 | Japan ................................. | G06F 9/44 |

OTHER PUBLICATIONS

F. Pipitone, "The FIS Electronics Troubleshooting System," IEEE Computer, pp. 68–76, Jul. 1986.

J. Poshtan and R. Doraiswami, "Influence Matrix Approach to Fault Diagnosis and Controller Tuning," Proc. Canadian Conf. on Electrical and Computer Engineering, pp. 810–813, Sep. 1994.

*Primary Examiner*—Robert W. Downs
*Attorney, Agent, or Firm*—Welsh & Katz, Ltd.

[57] ABSTRACT

A cause inferring device which infers causes with improved accuracy and efficiency. A phenomenon item (F) other than phenomenon items (A, B and C) for which frequency-of-occurrence data are already inputted is selected based on the degree of association data regarding cause items (2, 3 and 4) having the highest certainty among cause items (1–5) whose certainties are calculated. The frequency-of-occurrence data of the selected phenomenon item (F) and already inputted frequency-of-occurrence data are inputted again and the certainties of the cause items are computed. By repeating such selection and arithmetic processing at least once, causes are narrowed down as a final inference.

6 Claims, 7 Drawing Sheets

FIG.3

INSPECTION ITEM

| CAUSE ITEM | A | B | C | D | E | F | G |
|---|---|---|---|---|---|---|---|
| (1) |  | 0.1 |  | 1 | 0.1 | 0.5 | 1 |
| (2) | 1 | 0.5 |  | 0.5 |  | 0.1 |  |
| (3) |  | 1 | 0.5 |  |  | 1 | 1 |
| (4) | 0.5 |  | 1 |  |  | 1 | 0.1 |
| (5) | 0.1 |  |  | 0.5 | 0.5 | 1 |  |

FIG.4

INSPECTION ITEM

| CAUSE ITEM | A | B | C | D | E | F | G |
|---|---|---|---|---|---|---|---|
| (1) |  | 0.1 |  | 1 | 0.1 | 0.5 | 1 |
| (2) | 1 | 0.5 |  | 0.5 |  | 0.1 |  |
| (3) |  | 1 | 0.5 |  |  | 1 | 1 |
| (4) | 0.5 |  | 1 |  |  | 1 | 0.1 |
| (5) | 0.1 |  |  | 0.5 | 0.5 | 1 |  |

FIG.5

INSPECTION ITEM

| CAUSE ITEM | A | B | C | D | E | F | G |
|---|---|---|---|---|---|---|---|
| (1) |  | 0.1 |  | 1 | 0.1 | 0.5 | 1 |
| (2) | 1 | 0.5 |  | 0.5 |  | 0.1 |  |
| (3) |  | 1 | 0.5 |  |  | 1 | 1 |
| (4) | 0.5 |  | 1 |  |  | 1 | 0.1 |
| (5) | 0.1 |  |  | 0.5 | 0.5 | 1 |  |

INSPECTION ITEM NAME

|  | A | B | C | D | E | F |
|---|---|---|---|---|---|---|
| (1) | 1 | U | U | U | U | U |
| (2) | 0 | 1 | 1 | U | U | U |
| (3) | 0 | 1 | 0 | U | U | U |
| (4) | 0 | 0 | U | 1 | 1 | U |
| (5) | 0 | 0 | U | 1 | 0 | U |
| (6) | 0 | 0 | U | 0 | U | 1 |
| (7) | 0 | 0 | U | 0 | U | 0 |

GOAL NAME

IN THE TABLE,
1 CORRES. TO (Y)
0 CORRES. TO (N)
U MEANS UNRELATED

INSPECTION ITEM

| CAUSE | A | B | C | D | E | F | G | H | I | J |
|---|---|---|---|---|---|---|---|---|---|---|
| (1)-1 | 1 | 1 | unk | unk | unk | unk | unk | unk | unk | unk |
| (1)-2 | unk | unk | 0 | 0 | unk | 0 | unk | unk | unk | unk |
| (2)-1 | 1 | 0 | unk | 1 | unk | unk | unk | unk | unk | unk |
| (2)-3 | unk | 0 | 1 | unk | unk | unk | unk | 0 | unk | unk |
| (3)-1 | 1 | 0 | unk | 0 | unk | unk | unk | unk | unk | unk |
| (3)-2 | unk | unk | 0 | 0 | unk | 1 | 0 | unk | unk | unk |
| (3)-3 | unk | 0 | 0 | unk | unk | unk | unk | unk | unk | unk |
| (4)-1 | 0 | unk | 1 | unk | unk | unk | unk | unk | unk | unk |
| (4)-3 | unk | 0 | 1 | unk | unk | unk | unk | 1 | 1 | 1 |
| (5)-1 | 0 | unk | 0 | unk | unk | unk | unk | unk | unk | unk |
| (5)-2 | unk | unk | 0 | 0 | unk | 1 | 1 | unk | unk | unk |
| (5)-3 | unk | 1 | unk | unk | unk | unk | 1 | unk | unk | unk |
| (6)-2 | unk | unk | 1 | unk | 1 | unk | unk | unk | unk | unk |
| (6)-3 | unk | 0 | 1 | unk | unk | unk | unk | 1 | 1 | 0 |
| (7)-2 | unk | unk | 1 | unk | 0 | unk | unk | unk | unk | unk |
| (7)-3 | unk | 0 | 1 | unk | unk | unk | unk | 1 | 0 | unk |
| (8)-2 | unk | unk | 0 | 1 | unk | unk | unk | unk | unk | unk |
| (8)-3 | unk | 1 | unk | unk | unk | unk | 0 | unk | unk | unk |

1 = YES    0 = NO    unk = UNRELATED

FIG.9

| | A | B | C | D | E | F | G | H | I | J |
|---|---|---|---|---|---|---|---|---|---|---|
| (1)-1 | 1 | 1 | unk | unk | unk | unk | unk | unk | unk | unk |
| (1)-2 | unk | unk | 0 | 0 | unk | 0 | unk | unk | unk | unk |
| (3)-1 | 1 | 0 | unk | 0 | unk | unk | unk | unk | unk | unk |
| (3)-2 | unk | unk | 0 | 0 | unk | 1 | 0 | unk | unk | unk |
| (3)-3 | unk | 0 | 0 | unk | unk | unk | unk | unk | unk | unk |
| (4)-1 | 0 | unk | 1 | unk | unk | unk | unk | unk | unk | unk |
| (4)-3 | unk | 0 | 1 | unk | unk | unk | unk | 1 | 1 | 1 |
| (8)-2 | unk | unk | 0 | 1 | unk | unk | unk | unk | unk | unk |
| (8)-3 | unk | 1 | unk | unk | unk | unk | 0 | unk | unk | unk |

FIG.10

CAUSE INFERRING DEVICE

TECHNICAL FIELD

The present invention relates to a cause inferring device whereby a true cause is inferred using a knowledge base in which knowledge expressing the relationship between various phenomenon items and various cause items is represented in the form of a matrix or in the form of a decision tree, and more particularly to an inferring device that is suited to application to fault diagnosis of machines.

BACKGROUND ART

Conventional methods of fault diagnosis of machines such as construction machinery include the following two well known methods.

One is the method of diagnosis in which the various phenomenon items (inspection items) are treated as nodes where branching is effected in accordance with the answer (e.g. YES, NO) constituting the result of the associated inspection, so as to lead to the cause which represents the final conclusion.

Since the knowledge indicating the relationship between the various inspection items and the various cause items is expressed in a decision tree structure, this is called FTA diagnosis (Fault Tree Analysis).

In another method of diagnosis, degree of relationship data indicating the degree of relationship of the various inspection items and the various cause items are arranged in the fashion of a matrix in which either the inspection items or cause items are rows while the other one of these are the columns; frequency of occurrence data are input indicating the degree to which the prescribed inspection item of the various inspection items occurs. The likelihood of a cause item can then be calculated from these frequency of occurrence data that have been input and degree of association data, arranged in matrix fashion; the cause is inferred from these calculated certainties. Since the knowledge regarding the causal relationship between the inspection items and the fault cause items is represented in the form of a matrix, this is called matrix fuzzy diagnosis.

Furthermore, a technique whereby knowledge of a decision tree structure for FTA diagnosis is converted into knowledge arranged in matrix fashion for matrix fuzzy diagnosis is disclosed in Japanese Patent Publication H. 3-116330 and so is already public knowledge.

Also, methods of inference called incident base inference (ID3 etc.) are widely known, in which an efficient method of categorization resulting from extraction of data characteristics from incident data is represented in the form of a decision tree.

This incident base inference is a technique whereby general rules are compiled from a collection of past incidents (problem and solution set) and when a new incident is presented the solution is found by using these rules; this is utilized as one method of knowledge acquisition.

In incident base inference, a decision tree is compiled whereby classes (categorized item: is a melon, is an apple, etc.) are categorized using for example the properties of the collection of past incidents (question item: what color, what size, etc.) and property values (values that the reply to the question may take: green, red, or large, small, etc.).

A characteristic advantage of matrix fuzzy diagnosis is that the candidate fault causes can be narrowed down even if the inspection item frequency of occurrence is unanswerable or even if inspection results are input in which the frequency of occurrence is expressed in terms of uncertainty with a numerical value in the range 0 to 1.

However, there was the drawback that if the information provided by the inspection items is insufficient the precision with which the causes are narrowed down was poor.

Also, there was the problem that, although the cause of the fault is output represented by a certainty, it was not possible to present effective inspection items that would further narrow down the cause from among a plurality of candidate fault causes for which the same certainty is expressed.

Furthermore, when the inspections are to be carried out, the inspection items are simply displayed as a list, so it was not possible to ascertain which inspection, of the plurality of inspection items, would be effective for diagnosis and so the progress of the diagnosis as a whole cannot be forecast.

In contrast, a characteristic of FTA diagnosis is that this is a method wherein, as inspection proceeds from the uppermost inspection items (nodes) of the decision tree, the answer to the inspection indicates a branch which when followed successively presents the next inspection item (node) as response, so there is the advantage that the fault cause (conclusion) can be narrowed down finally to a single cause by a minimum of inspection items. A further advantage is that, since the knowledge of the FTA diagnosis is represented in the form of a decision tree, the outlook for the diagnosis as whole can easily be forecast.

However, in some cases, if an intermediate inspection item cannot be answered, or if the answer includes uncertainty, a final solution of the diagnosis cannot be obtained.

Thus, as mentioned above, matrix fuzzy diagnosis was subject to the problems regarding accuracy and operational efficiency that:

Problem 1: if there are many inspection items, it was difficult to keep all the inspection items in view;

Problem 2: one cannot decide which inspection item is the more necessary at a particular time-point: in other words, unnecessary inspection items cannot be excluded; and Problem 3: if answers (causes) having the same certainty are obtained, one cannot tell which inspection items would be effective to narrow these causes down further.

Also, FTA diagnosis was subject to the problems regarding accuracy and operational efficiency that:

Problem 4: since answers to inspection items are represented by branches, only answers possessing no uncertainty (e.g. YES, NO etc.) can be used i.e. information including uncertainty cannot be handled;

Problem 5: since the order of the inspections is fixed, it was not possible to prioritize use of already-known information; also, if an inspection item is unclear the diagnosis was held up; and Problem 6: until all the inspection items relating to a given cause item have been answered, it was not even possible to see the trend of the diagnostic results.

Furthermore, FTA diagnosis was subject to the problem regarding operational efficiency that in some cases knowledge for diagnosis of causes is prepared using a plurality of decision tree structures, and in such cases:

Problem 7: even if the knowledge is arranged in decision tree structure, since there is a plurality of decision trees, inspection items and cause items can be duplicated, making it hard to obtain an overall grasp of the FTA knowledge. In other words, whichever decision tree is examined it is hard to tell what diagnosis should be made.

DISCLOSURE OF THE INVENTION

With the foregoing in view, it is an object of the present invention to provide a cause inferring device that solves the above problems 1 to 7.

Accordingly, a first aspect of the present invention consists in a cause inferring device wherein degree of association data indicating the degree of association between various phenomenon items and various cause items are prepared as matrix-form data in which one of the phenomenon items and cause items constitute the rows while the other constitute the columns, frequency of occurrence data indicating the frequency of occurrence of prescribed phenomenon items of the various phenomenon items are input, certainties of the cause items are calculated using these frequency of occurrence data that have been input and the matrix-form degree of association data, and the cause is inferred from these calculated certainties, characterized in that the device comprises: phenomenon selection means that selects a phenomenon item, other than the phenomenon items whose degree of association data have already been input, in accordance with degree of association data relating to cause items of highest certainty, of the cause items whose certainty has been calculated; certainty arithmetic processing means that calculates the certainty of a cause item by re-inputting the frequency of occurrence data of the selected phenomenon item and the already-input frequency of occurrence data; and repetition means that effects at least a single repetition of the arithmetic processing performed by the certainty arithmetic processing means and selection processing performed by the phenomenon item selection means, the cause being inferred from the certainties of the cause items calculated as a result of the repetition performed by the repetition means.

Also, according to a second aspect of the present invention, in a cause inferring device according to the construction of the first aspect of the present invention, characterized in that, when there is prepared a knowledge base of decision tree structure in which each node represents a phenomenon item of various kinds, and each conclusion represents a cause item of various kinds, this knowledge base of decision tree structure is converted to the matrix-form degree of association data and inference of causes is performed by using this matrix-form degree of association data obtained by this conversion process.

Also a third aspect of the present invention consists in a cause inferring device wherein there is prepared a knowledge base of decision tree structure wherein various phenomenon items are taken as nodes and various cause items are taken as conclusions, causes being inferred using this knowledge base of decision tree structure, characterized in that the device comprises: when there is prepared a plurality of knowledge bases of decision tree structure, first conversion means whereby prescribed cause items are selected from the various cause items and the plurality of knowledge bases of decision tree structure is converted to matrix-form data in which one of the selected cause items and phenomenon items of various kinds constitute the rows while the other constitute the columns, and wherein the matrix components are degree of association data indicating the degree of association of the cause items and phenomenon items; and second conversion means whereby the matrix-form degree of association data obtained by the conversion performed by the first conversion means are converted to a knowledge base of decision tree structure wherein the selected prescribed cause items constitute conclusions and the phenomenon items of various kinds constitute nodes, the cause being inferred from the selected prescribed cause items using the knowledge base of decision tree structure obtained by the conversion performed by the second conversion means.

Also, according to a fourth aspect of the present invention, in a cause inferring device according to the second aspect of the present invention, characterized in that there is prepared a plurality of knowledge bases of the decision tree structure, and that the device comprises: first conversion means whereby prescribed cause items are selected from the various cause items and the plurality of knowledge bases of decision tree structure is converted to matrix-form data in which one of the selected cause items and phenomenon items of various kinds constitute the rows while the other constitute the columns, and wherein the matrix components are degree of association data indicating the degree of association of the cause items and phenomenon items; and second conversion means whereby the matrix-form degree of association data obtained by the conversion performed by the first conversion means are converted to a knowledge base of decision tree structure wherein the selected prescribed cause items constitute conclusions and the phenomenon items of various kinds constitute nodes, the cause being inferred, after converting the knowledge base of decision tree structure obtained by the conversion performed by the second conversion means into the matrix-form degree of association data, using the matrix-form degree of association data obtained by this conversion process.

With the invention constituted as in the first aspect of the present invention, as shown in FIG. 5, of the cause items (1) to (5) whose certainties have been calculated, a phenomenon item F is selected (other than the phenomenon items A, B, C whose frequency of occurrence data have already been input) using the degree of association data relating to cause items (2), (3) and (4) whose certainties were found to be highest. The frequency of occurrence data of selected phenomenon item F and the frequency of occurrence data that have already been input are then re-input to calculate the certainty of the cause items. Narrowing down to the final causes is effected by repeating this selection and arithmetic processing at least once.

In this way an efficacious inspection item (phenomenon item) is presented and diagnosis is performed efficiently with a number of inspection items that is close to the minimum. Thus problems 1, 2 and 3 are solved.

Also, with the construction of the second aspect of the present invention, as shown in FIG. 6, when there is prepared a knowledge base of decision tree structure in which the nodes are the various phenomenon items A, B, C . . . , and the conclusions are the various cause items (1), (2), (3) . . . , as shown in FIG. 7, this knowledge base of decision tree structure is converted into matrix-form degree of association data and cause inference according to the first aspect of the present invention is performed using the matrix-form degree of association data obtained by this conversion process.

In this way, FTA diagnostic knowledge is converted to fuzzy matrix diagnostic knowledge, and, by executing fuzzy matrix diagnosis, it is possible to take into consideration inspection items (phenomenon items) in respect of which no answer can be obtained or input of numerical values indicating uncertainty, and the order of the inspections can be determined at will. Also, the cause items can be narrowed down even if it is not possible to answer all the inspection items. That is, problems 4, 5 and 6 are solved.

Also, with the construction of the third aspect of the present invention, as shown in FIGS. 8(a), (b) and (c), by selecting prescribed cause items (1), (3), (4) and (8) from the various cause items (1) to (8), the plurality of knowledge bases of decision tree structure FTA1, 2 and 3 is converted into matrix-form data in which, as show in FIG. 10, one of the selected cause items (1), (3), (4), (8) and the various inspection items A to J are the rows while the other are the columns and the matrix components are degree of association data showing the degree of association of the cause items and phenomenon items. Also, as shown in FIG. 11(c), the matrix-form degree of association data obtained by this conversion process are converted into a knowledge base of decision tree structure in which the prescribed selected cause items (1), (3), (4) and (8) are taken as the conclusions and the various phenomenon items A, B, C, D, F are the nodes. Then, using the knowledge base of decision tree structure obtained by this conversion process, a cause is inferred from the prescribed selected cause items (1), (3), (4) and (8). Thus the above problem 7 is solved. To convert the plurality of FTA diagnostic knowledge bases into a single FTA diagnostic knowledge base, the incident base inference (ID3) technique can be adopted.

Also, with the construction of the fourth aspect of the present invention, as with the third aspect of the present invention, the knowledge of a plurality of decision trees is converted to the knowledge of a single decision tree and the knowledge of the decision tree obtained by this conversion process is converted into matrix-form knowledge as in the second aspect of the present invention, and inference is performed in the same way as in the first aspect of the present invention. That is, all of problems (1) to (7) are solved.

BRIEF DESCRIPTION OF THE DRAWINGS

FIG. 3 is a diagram showing the organization of knowledge in matrix form used in explanation of the first embodiment of the present invention;

FIG. 4 is a diagram showing the organization of knowledge in matrix form used in explanation of the first embodiment of the present invention;

FIG. 5 is a diagram showing the organization of knowledge in matrix form used in explanation of the first embodiment of the present invention;

FIG. 9 is a diagram showing the organization of knowledge in matrix form used in explanation of the third embodiment of the present invention;

FIG. 10 is a diagram showing the organization of knowledge in matrix form used in explanation of the third embodiment of the present invention.

BEST MODE FOR CARRYING OUT THE INVENTION

Figure 1:
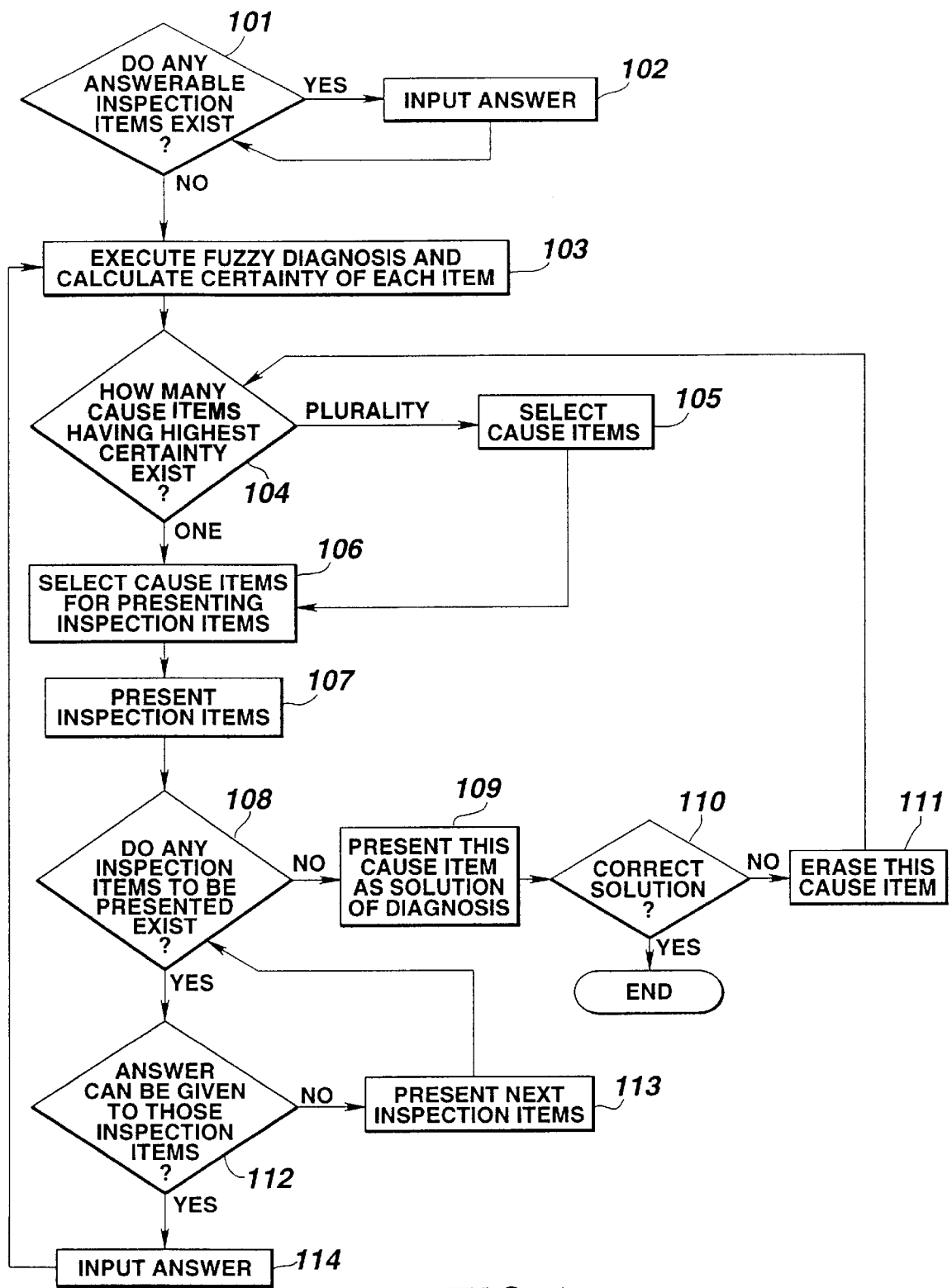
FIG. 1 is a flow-chart used in explanation of an embodiment of a cause inference device according to the present invention.

Embodiments of a cause inference device according to the present invention are described below with reference to the drawings. In the embodiments a fault diagnosis device for building machinery is assumed. Specifically, a personal computer performs fault diagnosis of building machinery In accordance with the procedure shown in FIG. 1 to FIG. 2.

First embodiment

FIG. 3 shows the organization of matrix fuzzy diagnostic knowledge for performing fault diagnosis in matrix form. Columns A to J of the matrix show phenomenon items constituting fault inspections; rows (1) to (8) show the cause items of these faults.

The phenomenon items are for example phenomenon A "black exhaust", phenomenon B "no power", phenomenon C "gradually got worse"; inspections corresponding to these phenomena are performed. The cause items are for example cause (1) "blockage of air cleaner"; cause (2) "injection nozzle defective"; cause (3) "battery defective". The matrix components of the matrix correspond to data showing the degree of association between the corresponding inspection item and cause item. This degree of relationship data is set beforehand as a numerical value of uncertainty in the range 0 to 1 and is stored at a prescribed memory location. For example, numerical value "0" corresponds to "no relation at all" and numerical value "1" corresponds to "lose relationship". Also, if the causal relationship between the inspection item and the cause item is not clear, the numerical value is not set.

First of all, by for example operating the keyboard of the personal computer, the operator enters data indicating the current frequency of occurrence of the prescribed inspection items A, B, C, of the various inspection items referred to above, in respect of which an answer can be given. This frequency of occurrence data is supplied as a numerical value expressing uncertainty in the range 0 to 1. For example, numerical value "0" corresponds to the perception "does not occur at all" and numerical value "1" corresponds to the perception "occurs frequently". For example, data A=0.6, B=0.6, C=0.6 may be input (steps 101, 102).

As a result, fuzzy diagnosis is executed using the input frequency of occurrence data and the degree of association data; the certainties of the various cause items are calculated as for example:

cause item (1)=2% cause item (2)=47% cause item (3)=47% cause item (4)=47% cause item (5)=2%

(step 103).

Next, from the cause items whose certainties have thus been calculated the cause items having the highest certainty are extracted (step 104). If at this point the cause item for which the certainty is highest is a single one, this cause item is selected as the cause item for use in proposing an efficacious inspection item (step 106). In order to narrow down the cause items, an inspection item associated with this cause item but not one of the inspection items (A, B, C) in respect of which frequency of occurrence data has already been input is then presented as an efficacious inspection item (step 107). However, in the case of this embodiment, as mentioned above, there is a plurality of cause items (2), (3), and (4) which have the same certainty (47%), so it is necessary to narrow down the cause item that is to be used for proposing an efficacious inspection item. The procedure therefore shifts to step 105, in which a cause item is selected by for example the techniques described below.

If there is a plurality of cause items that have the same certainty and a related inspection item is shared by some of these cause items, this shared inspection item is presented.

If there is a plurality of cause items that have the same certainty but no related inspection item is shared by the cause items, a cause item is selected by the following methods and a suitable inspection item related to this selected cause item is presented.

Method 1) Of the cause items that have the same certainty, the cause item that has fewest uninspected inspection items is selected, and an inspection item associated with this selected cause item is presented.

Method 2) An inspection item associated with the cause item that in the past occurred with highest frequency is presented.

Method 3) Regular diagnosis is performed using the cause items and inspection items showing the highest certainty, by means of information regarding the frequency relationships of the cause items and inspection items, to thereby select cause items of highest frequency. The inspection item associated with this selected cause item (i.e. the inspection item whose causal relationship with this cause is closest) is presented.

It should be noted that the inspection items to be presented, of all the inspection items available, exclude those whose frequency of occurrence data has already been input (inspection items A, B, and C).

In the case of this embodiment, as shown by the thick line in FIG. 4, there is a plurality of cause items (2), (3) and (4) of the same certainty. These share a common associated inspection item F, so this shared inspection item F is presented (step 107).

Next, it is determined whether or not the inspection item to be presented is present i.e. whether or not the inspection items associated with the selected cause item include an unanswered inspection item (i.e. an inspection item whose frequency of occurrence has not yet been input) (step 108).

In the case of this embodiment, inspection item F is present, so the procedure shifts to step 112 and it is determined whether or not an answer can be obtained in respect of this inspection item i.e. whether or not it is possible to input frequency of occurrence data in respect of it (step 112).

If data in respect of inspection item F cannot be provided, the next inspection item is presented (step 113); if the frequency of occurrence data for inspection item F can for example be set to "1", this frequency of occurrence data is input (step 114) and the procedure again shifts to step 103. Fuzzy diagnosis is then executed in the same way using the frequency of occurrence data of this inspection item F and the frequency of occurrence data of the inspection items that has already been input. As a result, the certainties in respect of the various causes are calculated as follows:

cause item (1)=30%
cause item (2)=26%
cause item (3)=55%
cause item (4)=55%
cause item (5)=53%
(step 103).

By subsequent processing in the same way, inspection item G is presented (step 107); of the inspection items associated with cause items (3) and (4) for which the certainty (55%) is highest, as shown in FIG. 5, this inspection item is common (excluding cause items A, B, C and F, in respect of which frequency of occurrence data have already been input).

Then, by executing processing in the same way, the frequency of occurrence data of inspection item G is set to for example "0.2", which is input (step 114) and fuzzy diagnosis is again executed using the frequency of occurrence data of inspection items A, B, C, F and G.. As a result, the certainties of each cause item are calculated as follows.

cause item (1)=16%
cause item (2)=26%
cause item (3)=39%
cause item (4)=56%
cause item (5)=53%
(step 103).

Of these, cause item (4) displays the highest certainty (56%), and, of the associated inspection items, no inspection item has not been answered (see FIG. 5: the determination of step 108 is "none"), so this causes item (4) to be taken as the result of the diagnosis. It should be noted that, in this case, the inspection items to which an answer could not be obtained because an answer was impossible may be deemed to be answered (steps 109, 110).

Also, after a given cause item has been taken as the answer of the diagnosis, if for example this was not in fact the correct solution (evaluation NO in step 110), by deleting this cause item (step 111), the cause item of next-highest certainty is selected and an inspection item associated with this selected cause item can be presented (steps 104, 105, 106, 107).

It may further be noted that even if at the time-point when diagnosis is commenced there is not even a single item of information by way of an answer to the inspection items, all the input values being 'answer impossible' the certainty of each cause item can still immediately be calculated and the inspection item arranged to be presented.

Figure 2:
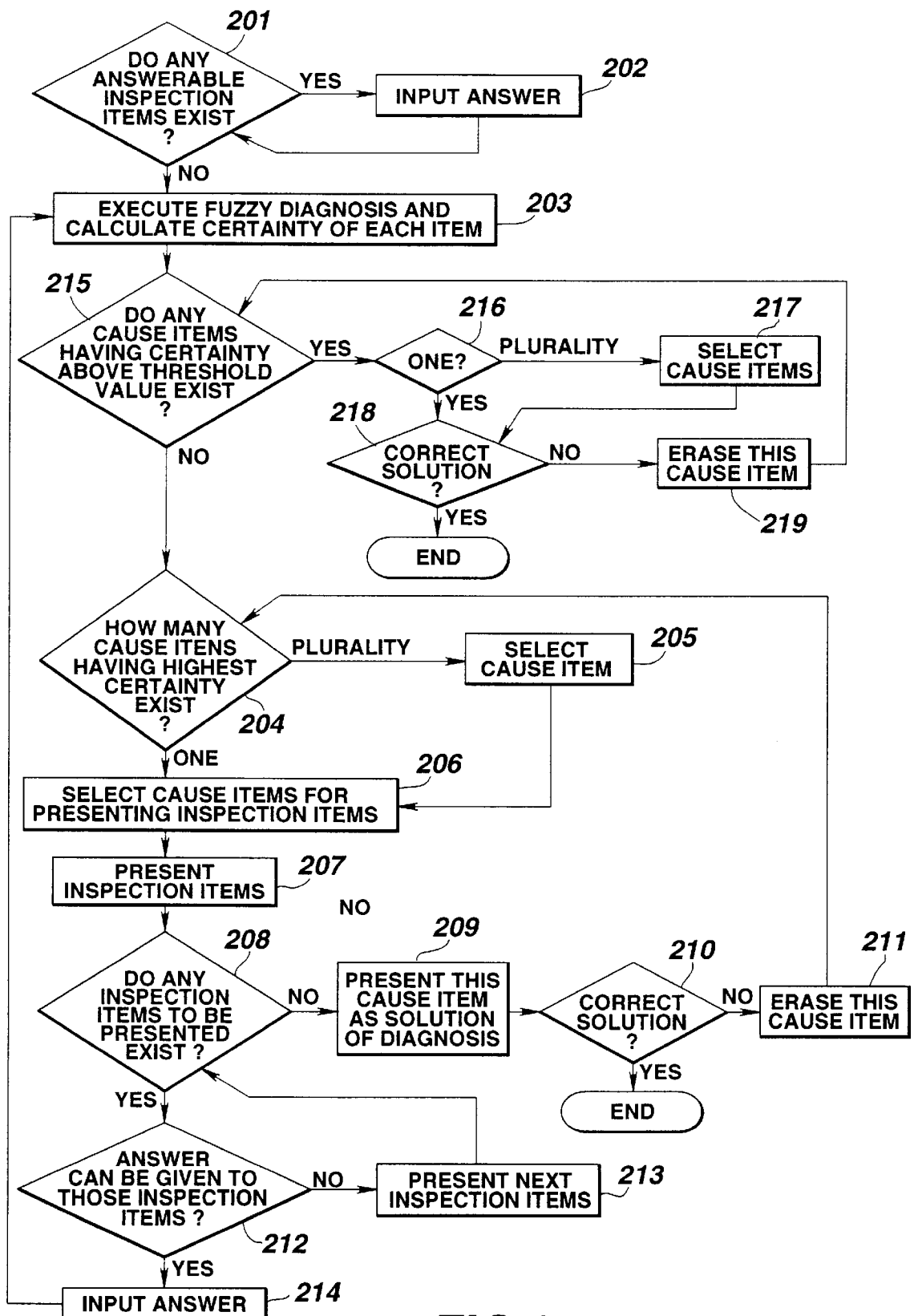
FIG. 2 is a flow-chart used in explanation of an embodiment of a cause inference device according to the present invention.

FIG. 2 shows processing wherein the certainties of the cause items are given a fixed threshold value beforehand and if during the course of diagnosis the calculated certainty reaches a value at or above this threshold value, the cause item of this threshold value or more is taken as the answer of the diagnostic process.

In more detail, in steps 201 to 214 processing identical with steps 101 to 114 above is executed, but, at the time-point when the certainty of the cause items is calculated (step 203), it is ascertained whether or not the certainty has reached or exceeded the threshold value (step 215); if, as a result, it is found that one of the cause items has a certainty at or above the threshold value, this cause item is taken as the correct answer (steps 216, 218).

Also, if there is a plurality of cause items with a certainty at or above the threshold value, in order to narrow down the cause items, cause item selection processing is executed in the same way as in step 105 above (step 217), and the cause item which is thereby selected is taken as the correct answer (step 218).

Also, after a given cause item has been identified as the answer of the diagnostic process, if for example this did not prove to be the correct answer (evaluation NO in step 218), just as in the case of step 111 above, this cause item is erased (step 219).

With the first embodiment as described above, even if a plurality of cause items shares the same value of the certainty, an inspection item that is efficacious in narrowing down the cause items can still be presented, so that efficient and accurate diagnosis can be achieved with a number of inspection items that is close to the minimum.

Second Embodiment

Next, an embodiment will be described in which the fuzzy diagnosis illustrated in the first embodiment can be applied even when the knowledge is expressed in a form for FTA diagnosis.

In this embodiment, as pre-processing for the processing of FIG. 1 to FIG. 2, processing is performed in which the FTA diagnostic knowledge is converted to fuzzy matrix diagnostic knowledge.

Figures 6, 7:
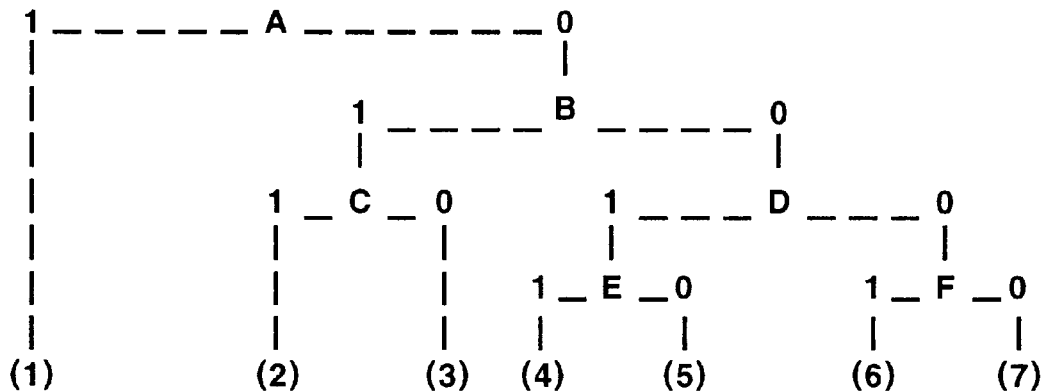
FIG. 6 is a diagram showing the organization of knowledge in decision tree form used in explanation of a second embodiment of the present invention.
FIG. 7 is a diagram showing the organization of knowledge in matrix form used in explanation of the second embodiment of the present invention.

Specifically, as shown in FIG. 6, the FTA diagnostic knowledge is expressed in the form of a decision tree in which the nodes are inspection items A, B, C . . . and the conclusions (goals) are cause items (1), (2), (3) . . .

In this case, a node branch is one or other of ("YES"/"1") i.e. the inspection phenomenon appeared or ("NO"/"0") i.e. the inspection phenomenon did not appear. Accordingly, the knowledge of this decision tree is converted to matrix-form knowledge for the purpose of fuzzy matrix diagnosis as shown in FIG. 7.

In more detail, the columns (inspection items) of the matrix of FIG. 7 are the nodes A, B, C . . . of the decision tree and the rows (cause items) are the conclusions (1), (2), (3) . . . of the decision tree. The matrix components (degree of association data) are data indicating the content of the branches directed to the conclusions from the nodes of the decision tree.

The values of the degree of association data are determined in accordance with the branch contents in the decision tree. Specifically, if an inspection item branch is related to a cause item, the degree of association data between this inspection item and cause item is set to a value ("1"/"0") corresponding to the branch content ("YES"/"NO"). And if an inspection item branch is unrelated to a cause item, the degree of association data between this inspection item and cause item is not indicated as a numerical value but is set to "U" indicating "unrelated".

For example, inspection item A is branched at "1" with respect to cause item (1) (see FIG. 6), so the corresponding degree of association data is "1" (see FIG. 7). Likewise inspection item A is branched at "0" with respect to cause item (2) (see FIG. 6), so the corresponding degree of association data is "0" (see FIG. 7). Also inspection item B has no branch in respect of cause item (1) (see FIG. 6), so the corresponding degree of association data is "U" (see FIG. 7).

When this pre-processing for knowledge conversion has been performed, the procedure shifts to step 101 of FIG. 1, and fuzzy diagnosis is executed in the same way using the matrix-form knowledge obtained by this conversion and shown in FIG. 7.

However, the way in which an efficacious cause item is presented is different from that of embodiment 1. Specifically, if, at the time-point where the cause items of highest certainty is selected, there is a plurality of inspection items (other than "unrelated"/"U" inspection items) related to this selected cause item, efficacious inspection items are presented successively, starting from those inspection items occupying higher levels in the decision tree prior to conversion. (In order to make this selection, the structure of the decision tree prior to conversion (i.e. the order of the inspection items) is stored beforehand in memory (steps 112, 113)).

Also, when there is a plurality of cause items having the same certainty, the cause items are narrowed down to one by the following methods, to enable an inspection item to be presented.

Even if there is a plurality of cause items of the same certainty, if they share an associated inspection item (apart from "unrelated"/"U"), this shared inspection item is presented.

If there is a plurality of cause items with the same certainty and there is also a plurality of shared presented inspection items as referred to above, a cause item is selected by the following methods and a suitable inspection item related to it is presented. An example is the case in FIG. 7 where there is a plurality of cause items (2), (3), (4) having the same certainty and these share a plurality of inspection items A, B.

Method 1) Of the cause items having the same certainty, the one which has fewest uninspected inspection items is selected, and the most efficacious inspection item relating thereto is presented.

Method 2) The branch points "weight" and "input value" where cause items of the same certainty intersect in the decision tree prior to conversion are compared and the cause item which shows the least difference as between these two is selected, and the most efficacious inspection item relating thereto is presented.

Method 3) The most efficacious inspection item related to the cause item which, in the past, showed highest frequency, is presented.

Method 4) The cause items of highest frequency are selected by performing regular diagnosis using the inspection items and cause items showing highest certainty, using knowledge regarding the frequency relationship of the cause items and inspection items, and the inspection item related thereto is presented (i.e. the inspection item that has the closest causal relationship with this cause, or the inspection item that occupies the highest level in the decision tree, prior to conversion).

As described above, with this second embodiment, the FTA diagnostic knowledge is replaced by fuzzy matrix diagnostic knowledge, and, by performing fuzzy matrix diagnosis, it is possible to take into account inspection items in respect of which an answer is impossible, or input of numerical values of uncertainty, and the sequence of detection can be decided upon in any desired manner. A further benefit is that the cause items can be narrowed down without needing to answer all the inspection items.

Third Embodiment

Figure 11A:
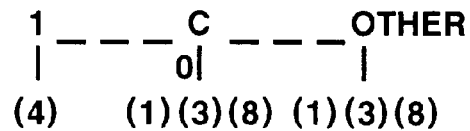
FIGS. 11(a), 11(b) and 11(c) are diagrams showing the organization of knowledge in decision tree form used in explanation of the third embodiment of the present invention.

Next, even if the knowledge in decision tree form exists in the shape of a plurality of decision trees, an embodiment whereby FTA diagnosis can be performed with high efficiency by summarizing these as a single decision tree is described with reference to FIGS. 8(a), (b), (c) to FIGS. 11(a), (b), (c).

Figure 8A:
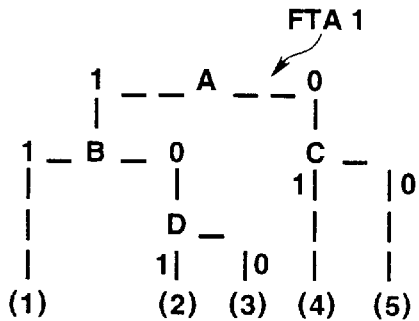
FIGS. 8(a), 8(b) and 8(c) are diagrams showing the organization of knowledge in decision tree form used in explanation of a third embodiment of the present invention.
Figure 8B:
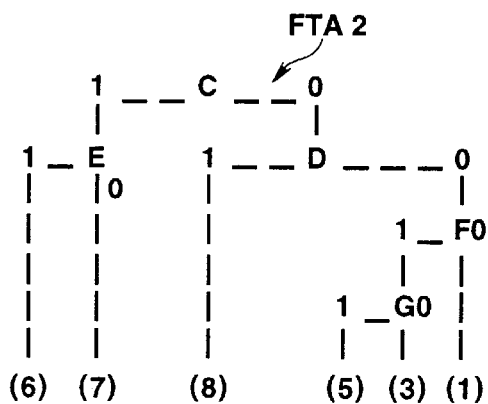
Figure 8C:
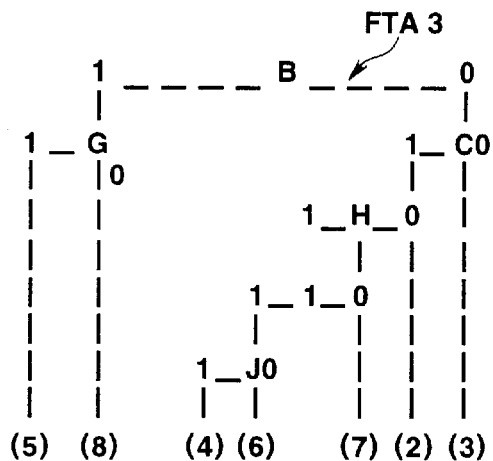

Let us now assume that a plurality of decision trees FTA1, 2, 3 exists as shown in FIGS. 8(a), (b) and (c).

Accordingly, this plurality of decision trees FTA1, 2, 3 is converted to matrix-form knowledge in the same way as in the second embodiment, as shown in FIG. 9.

However, since there is a plurality of decision trees, each row of the matrix is expressed with the cause items further classified in accordance with the type of decision tree. For example, in FIG. 9, "(1)-1" indicates cause item (1) in decision tree FTA1. "UNK" indicates "not related" like "U" above.

Next, processing is executed whereby only the knowledge corresponding to cause items that have already been narrowed down is extracted from the matrix-form knowledge obtained by the above conversion process. For example, if there are cause items (1), (3), (4), (8) that have already been estimated, knowledge in matrix form is extracted that relates solely to these cause items, as shown in FIG. 10.

Then, considering each item, one by one, of the "cause item—inspection answer group" of this matrix-form knowledge that was next extracted as shown in FIG. 10, as an incident, a decision tree for FTA diagnosis is compiled using the known ID3 technique. In this case, a cause item in the incident may be considered as a class, an inspection item may be considered as a property, and an answer value of an inspection may be considered as a property value.

First of all, the amount of information obtained by classifying the incidents in accordance with each property is found. As a result, the property that provides the greatest quantity of information is selected, and the incidents are classified in terms of this selected property. Details of the calculation of the amount of information are omitted here, but results of the calculation are given by way of example below.

Taking the nine incidents (each row) in FIG. 9,
the amount of information obtained by classifying using A was 0.47
the amount of information obtained by classifying using B was 0.56
the amount of information obtained by classifying using C was 0.80
the amount of information obtained by classifying using D was 0.60
the amount of information obtained by classifying using E was 0
the amount of information obtained by classifying using F was 0.46
the amount of information obtained by classifying using G was 0.24
the amount of information obtained by classifying using H was 0.08
the amount of information obtained by classifying using I was 0.28
the amount of information obtained by classifying using J was 0.28.

Figure 11B:
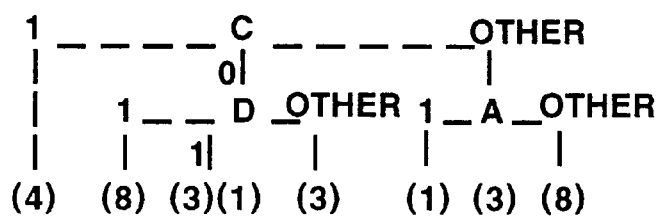
Figure 11C:
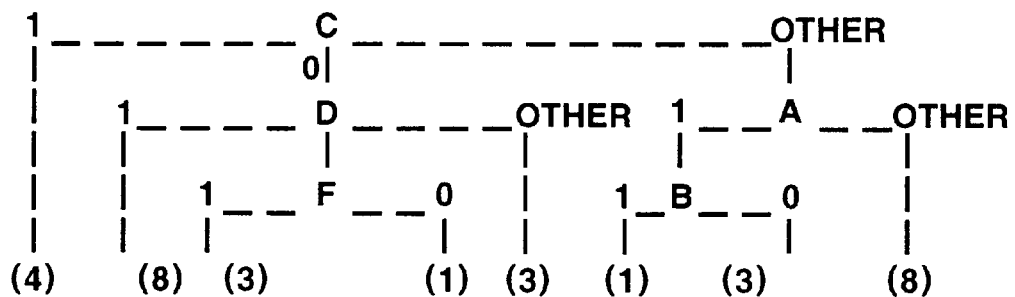

Accordingly, property C whereby the maximum amount of information (0.80) is obtained is selected from these calculated results, and a decision tree is generated in which property C occupies the highest level, as shown in FIG. 11(*a*), using the matrix-form knowledge of FIG. 10. In generation of this decision tree, not Just branches corresponding to degree of association data "1"/"0" but also new branches "other" corresponding to degree of association data "UNK" are provided.

Next, the lower-level structure of the decision tree is generated.

Specifically, since the only class (cause item) corresponding to branch "C=1" of the decision tree is (4), as can be seen from the knowledge of FIG. 10, further classification of this branch is unnecessary (see FIG. 11(*b*)).

Also, regarding the branch "C=0" of the decision tree, as is clear from the knowledge of FIG. 10, there are the following incidents:

incident of row (1)—2
incident of row (3)—2
incident of row (3)—3
incident of row (8)—2.

Thus, by calculating, as above, the amount of information obtained when the incidents of these 4 (rows) are classified by the properties, the property for which the amount of information is largest can be selected. As a result, property D, for which the maximum amount of information is obtained, is selected, and the structure of levels lower than branch "C=0" is generated (see FIG. 11(*b*)).

Regarding the branch "C="other"" of the decision tree, there are likewise the incidents:

incident of row (1)—1
incident of row (3)—1
incident of row (8)—2 so by calculating in the same way the amount of information obtained when the incidents of these three (rows) are classified in accordance with the properties, the property for which the amount of information is the largest can be selected. As a result, for example property A for which maximum information is obtained is selected, and the lower-level structure of branch "C="other"" is generated (see FIG. 11(*b*)). The lower-level structure of the branches "D=0", "A=1" are then generated in the same manner so that the decision tree shown in FIG. 11(*c*) is finally obtained.

FTA diagnosis is then performed using the knowledge in the form of this decision tree. Consequently, even in cases where some time might have been required for the diagnosis due to the presence of a plurality of decision trees, by summarizing these as a single decision tree, diagnosis can be performed efficiently by a very small number of inspection items A, C, D.

Furthermore, when converting the matrix-form knowledge to the decision-tree knowledge, treating the "unrelated" information in the same way as the other information "1" or "0", new branches "other" may be provided. Such "other" branches may be employed as rescue means in the event that following the other branches "1" or "0" does not arrive at the cause item constituting the correct solution, to extract other cause items of high likelihood.

Fourth Embodiment

In this fourth embodiment, the decision tree structure knowledge finally obtained in the third embodiment is further converted to matrix-form knowledge in the same way as in second embodiment so that fuzzy diagnosis can be performed as shown in FIG. 1 to FIG. 2.

It should be noted that, in the embodiments described above, the rows of the matrix-form knowledge may be taken as "inspection items" and the columns may be taken as "cause items".

As described above, with the present invention, when performing diagnosis using matrix-form knowledge, an efficacious inspection item is presented, so diagnosis can be performed in an efficient manner with a number of inspection items that is close to the minimum and the accuracy of inference can be raised.

Also, with the present invention, if the knowledge is provided in the form of a decision tree structure, this knowledge in the form of a decision tree structure can be converted to matrix-form knowledge, diagnosis being effected using the matrix-form knowledge obtained by this conversion, so it is possible to take into account inspection items in respect of which an answer cannot be obtained and/or input of numerical values of uncertainty, and the order of the inspections can be determined at will. Also, the cause items can still be narrowed down even if no answers are available in respect of any inspection items. The efficiency of the operation and the accuracy of inference can thereby be raised.

Also, with the present invention, even if the knowledge is provided in the form of a plurality of decision tree structures, these can be summarized as knowledge in a single decision tree structure and the diagnosis performed using the knowledge of the decision tree structure obtained by this conversion. Consequently, diagnosis can be performed efficiently by means of a single summarized decision tree: this very greatly increases efficiency.

INDUSTRIAL APPLICABILITY

The present invention can be applied to inference of all types of causes, not just fault diagnosis of machinery.

We claim:

1. A cause inferring device wherein degree of association data indicating degree of association between various phenomenon items and various cause items are prepared as matrix-form data in which one of the phenomenon items and the cause items constitute rows while the other constitute columns, frequency of occurrence data indicating frequency of occurrence of prescribed phenomenon item of the various phenomenon items are input, certainties of the cause items are calculated using the frequency of the input occurrence data and the matrix-form degree of association data, and a cause is inferred from the calculated certainties, wherein the device comprises:

phenomenon item selection means for selecting a phenomenon item, other than the phenomenon items whose degree of association data have been input, in accordance with the degree of association data relating to cause items of highest certainty, of the cause items whose certainties have been calculated;

certainty arithmetic processing means that calculates the occurrence data of the selected phenomenon item and the already-input frequency of occurrence data; and repetition means for effecting at least a single repetition of the arithmetic processing performed by the certainty arithmetic processing means and selection processing performed by the phenomenon item selection means, the cause being inferred from the certainties of the cause items calculated as a result of the repetition performed by the repetition means.

2. A cause inferring device according to claim 1 characterized in that, when there is prepared a knowledge base of decision tree structure in which each node represents a phenomenon item of various kinds and each conclusion represents a cause item of various kinds, the knowledge base of decision tree structure is converted to the matrix-form degree of association data and inference of causes is performed by using the matrix-form degree of association data obtained by the conversion process.

3. A cause inferring device according to claim 2, characterized in that there is prepared a plurality of knowledge bases of the decision tree structure, and that the device comprises:

first conversion means whereby prescribed cause items are selected from the various cause items and the plurality of knowledge bases of decision tree structure is converted to matrix-form data in which one of the selected cause items and phenomenon items of various kinds constitute rows while the other constitute columns, and wherein matrix components are degree of association data indicating the degree of association of the cause items and phenomenon items; and second conversion means whereby the matrix-form degree of association data obtained by the conversion performed by the first conversion means are converted to a knowledge base of decision tree structure wherein the selected prescribed cause items constitute the conclusions and the phenomenon items of various kinds constitute the nodes, the cause being inferred, after converting the knowledge base of decision tree structure obtained by the conversion performed by the second conversion means into the matrix-form degree of association data, using the matrix-form degree of association data obtained by the conversion process.

4. A cause inferring device wherein there is prepared a knowledge base of decision tree structure wherein various phenomenon items are taken as nodes and various cause items are taken as conclusions, causes being inferred using the knowledge base of decision tree structure, characterized in that the device comprises:

when there is prepared a plurality of knowledge bases of decision tree structure, first conversion means whereby prescribed cause items are selected from the various cause items and the plurality of knowledge bases of decision tree structure is converted to matrix-form data in which one of the selected cause items and phenomenon items of various kinds constitute rows while the other constitute columns, and wherein matrix components are degree of association data indicating degree of association of the cause items and phenomenon items; and second conversion means whereby the matrix-form degree of association data obtained by the conversion performed by the first conversion means are converted to a knowledge base of decision tree structure wherein the selected prescribed cause items constitute conclusions and the phenomenon items of various kinds constitute nodes, the cause being inferred from the selected prescribed cause items using the knowledge base of decision tree structure obtained by the conversion performed by the second conversion means.

5. An inferring device according to claim 4, characterized in that the first conversion means, if branches of the nodes of the knowledge base of decision tree structure are related to conclusions, sets corresponding degree of association data to prescribed values depending on a branch content and, if the node branches are not related to conclusions, does not set a value for the corresponding degree of association data, and that the second conversion means, if the values of the matrix-form degree of association data are prescribed values, sets the branches of the corresponding nodes to a branch content corresponding to the prescribed value and, if the values of the matrix-form degree of association data are not set, effects conversion such that a new branch is provided between corresponding conclusion and node.

6. A cause inferring device wherein degree of association data indicating degree of association between various phenomenon items and various cause items are prepared first as a knowledge base of decision tree structure in which each node represents a phenomenon item of various kinds and each conclusion represents a cause item of various kinds, and the knowledge base of decision tree structure is then converted to the matrix-form degree of association data in which one of the phenomenon items and the cause items constitute rows while the other constitute columns, frequency of occurrence data indicating frequency of occurrence of prescribed phenomenon item of the various phenomenon items are input, certainties of the cause items are calculated using the frequency of the input occurrence data and the matrix-form degree of association data, and a cause is inferred from the calculated certainties, wherein the device comprises:

phenomenon item selection means for selecting a phenomenon item, other data of the phenomenon items whose degree of association data have been input, in accordance with the degree of association data relating to cause items of highest certainty, of the cause items whose certainties have been calculated;

certainty arithmetic processing means that calculates the occurrence data of the selected phenomenon item and the already-input frequency of occurrence data; and repetition means for effecting at least a single repetition of the arithmetic processing performed by the certainty arithmetic processing means and selection processing performed by the phenomenon item selection means, the cause being inferred from the certainties of the cause items calculated as a result of the repetition performed by the repetition means.

* * * * *